US00RE33879E

United States Patent [19]

Shimizu

[11] E Patent Number: Re. 33,879

[45] Reissued Date of Patent: Apr. 14, 1992

[54] ROTARY HOOK ASSEMBLY

[75] Inventor: Hiromitsu Shimizu, Osaka, Japan

[73] Assignee: Hirose Manufacturing Company, Ltd., Osaka, Japan

[21] Appl. No.: 356,704

[22] Filed: Apr. 14, 1989

Related U.S. Patent Documents

Reissue of:

[64] Patent No.: 4,665,850
Issued: May 19, 1987
Appl. No.: 688,141
Filed: Dec. 31, 1984

[51] Int. Cl.[5] ..... D05B 57/08; D05B 57/26
[52] U.S. Cl. ..... 112/231
[58] Field of Search ..... 112/228, 230, 231; 428/627

[56] References Cited

U.S. PATENT DOCUMENTS 3,347,193 10/1967 Perri ..... 112/228
3,642,546 2/1972 Van Thyne et al. ..... 428/640 X
4,252,862 2/1981 Nishida ..... 428/627
4,346,123 8/1982 Kaufmann ..... 427/38
4,450,205 5/1984 Itaba et al. ..... 428/627
4,580,510 4/1986 Hirose ..... 112/80.5

FOREIGN PATENT DOCUMENTS 728247 4/1955 United Kingdom ..... 112/231

*Primary Examiner*—Werner H. Schroeder
*Assistant Examiner*—Paul C. Lewis
*Attorney, Agent, or Firm*—Wenderoth, Lind & Ponack

[57] ABSTRACT

A rotary hook assembly including a bobbin case basket, for therein accommodating a bobbin case containing a bobbin having bobbin thread wound therearound, on the outer periphery of which there is formed a guide rim. A rotary hook, for therein accommodating the bobbin case basket, has a guide groove formed on the inner periphery thereof. A metal hard-facing coating layer is applied on the outer periphery of the bobbin case basket, the inner periphery of the rotary hook, and/or the outer periphery of the bobbin case by utilizing an ion-plating method.

7 Claims, 2 Drawing Sheets

ROTARY HOOK ASSEMBLY

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a rotary hook assembly for a sewing machine.

2. Description of the Prior Art

In a conventional rotary hook assembly, a rotary hook rotates such that a guide groove formed in the rotary hook receives a guide rim formed in a bobbin case basket. Accordingly when the sewing machine is operated at a high speed, seizure may be caused by friction generated between the contacting faces of the rotary hook and the bobbin case basket. Furthermore, since the bobbin case basket may be forced to rotate in a direction equal to the direction of the rotary hook by the seizure thus generated, there may be generated resistance on a bobbin case basket retaining member, which would render it difficult for a needle thread to pass between the bobbin case basket and the retaining member, or cause the thread to break during the formation of seams.

SUMMARY OF THE INVENTION

In order to solve the problems mentioned above, it is an object of the present invention to provide an improved rotary hook assembly.

It is another object to provide a rotary hook assembly, wherein the friction between the contacting faces of the rotary hook and the bobbin case basket can be reduced to prevent the seizure, and an improvement is made in the sliding of the needle thread on the exterior of the bobbin case basket to avoid the thread breakage and to make better thread tightening during the formation of seams.

In order to fulfill the aforementioned objectives, there is provided a rotary hook assembly which comprises an bobbin case basket for therein accommodating a bobbin case, the bobbin case basket having a guide rim formed on the outer periphery thereof, a rotary hook for therein accommodating the bobbin case basket, the rotary hook having a guide groove formed on the bobbin periphery thereof, and the inner case basket, the rotary hook, and/or the bobbin case being covered with a coating layer consisting of titanium nitride (TiN) over the entire inner or the entire outer periphery thereof.

Consequently, in accordance with the invention, the occurrence of seizure can be prevented due to the reduction of friction between the contacting faces of the bobbin case basket and the rotary hook, which is a consequence of effecting the covering of the coating layer consisting of titanium nitride (TiN) thereon. Furthermore, thread-slipping on the exterior of the bobbin case basket can be improved, thereby preventing the thread breakage and improving the thread tightening during the formation of seams.

BRIEF DESCRIPTION OF THE DRAWINGS

These and other objects, features and advantages of the invention will become more apparent upon a reading of the following detailed specification and drawings, in which.

DETAILED DESCRIPTION OF THE PREFERRED EMBODIMENTS

Figure 1:
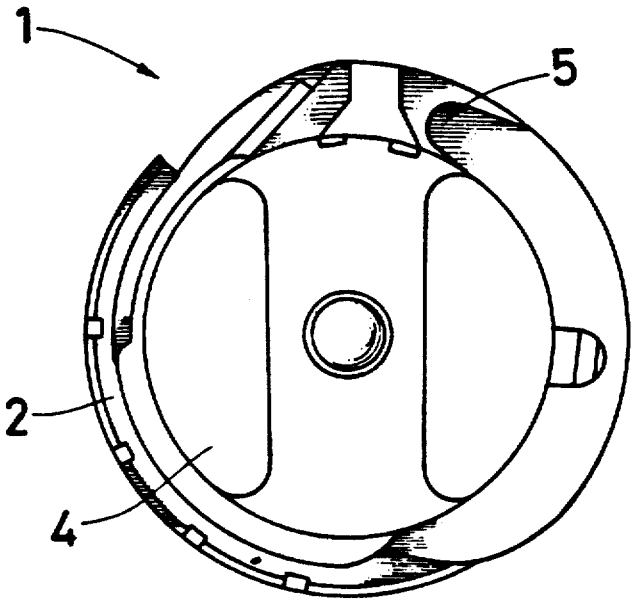
FIG. 1 is a plan view showing a bobbin case basket of an embodiment in accordance with the invention.

Referring now to the drawings, embodiments of the invention are described below.

FIG. 1 is a plan view showing one embodiment of a bobbin case basket 1 according to the invention. On the outer periphery of the bobbin case basket 1, there is formed a guide rim 2 for guiding the rotation of a rotary hook 10 (see FIG. 2 mentioned below). In a bobbin case basket 1, there is formed an accommodation chamber 4 for accommodating a bobbin case 14 (see FIG. 3 also mentioned below) accommodating a bobbin having bobbin threads wound therearound. While, on the outer periphery, including the guide rim 2 of the bobbin case basket 1, there is formed a metal hard-facing coating layer 5 consisting of titanium nitride (TiN).

Figure 2:
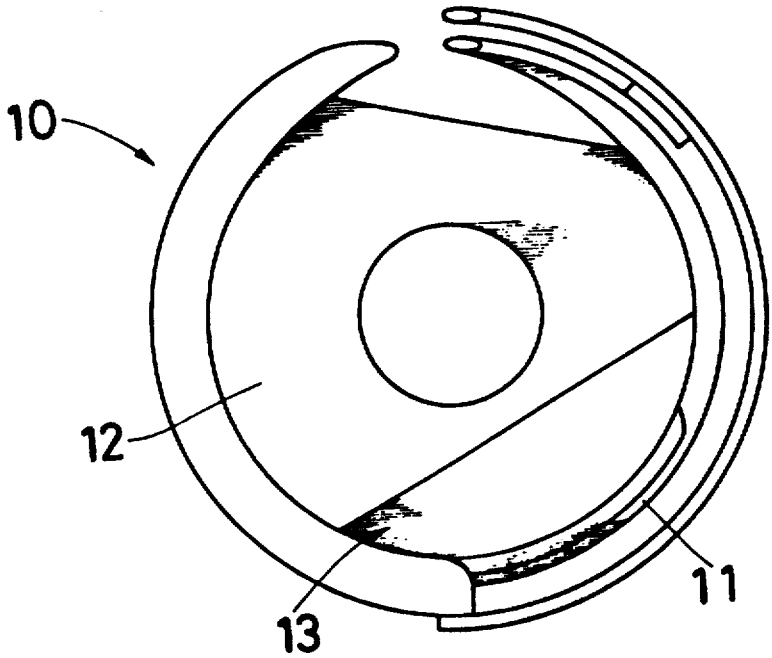
FIG. 2 is a plan view showing a rotary hook of the invention.

FIG. 2 is a plan view showing the rotary hook 10 of the invention. On the inner periphery of the rotary hook 10, there is formed a guide groove 11 which receives the guide rim 2 of the bobbin case basket 1. In the rotary hook 10, there is also formed an accommodation chamber 12 for accommodating the bobbin case basket 1. On the inner periphery, including the guide groove 11, of the rotary hook 10 (the interior of the accommodation chamber 12), similarly to the outer periphery of the inner shuttle 1, there is formed a metal hard-facing coating layer 13 consisting of titanium nitride (TiN).

Figure 3:
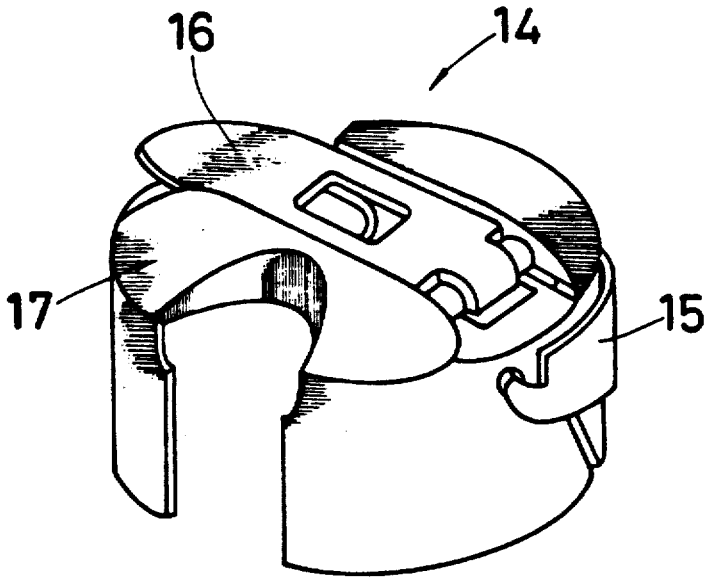
FIG. 3 is a perspective view showing a bobbin case of the invention.

FIG. 3 is a perspective view showing the bobbin case 14. The bobbin case 14 is provided with a lever plate 16 for enabling the bobbin case to be fitted into and removed from the bobbin case basket 1. The bobbin case 14 is further provided with a setting spring 15. In another embodiment of the invention, the outer periphery of the bobbin case 14 may also be covered with a metal hard-facing coating layer 17 consisting of the same elements as the elements of the coating layers mentioned above.

The bobbin case basket 1, the rotary hook 10, and/or the bobbin case 14 may be coated with titanium nitride (TiN) as the metal hard-facing coating layer, by a process known as ion-plating, which is the method employed in the present invention. Namely, titanium (Ti) is evaporated in the space in which glow discharge is performed through nitrogen (N) gas, and only resultant titanium nitride (TiN) is deposited on the surface of an object charged with negative electricity (the outer periphery of the bobbin case basket 1, the inner periphery of the rotary hook 10, and the outer periphery of the bobbin case 14 in the foregoing embodiment), thus effecting the covering of the metal hard-facing coating levers 5, 13, and 17. In the aforementioned embodiments, each of the bobbin case basket 1, the rotary hook 10, and the bobbin case 14 may be covered with TiN either over its entire inner or outer periphery, or over its partial inner or outer periphery.

Based on experiments carried out by the present inventor, the following advantages of the metal hard-facing coating layers 5, 13, and 17 due to the Ion-Plating Method can be obtained:

(a) It is possible to make golden the color itself of the metal hard-facing coating layer. Furthermore, since the tint of the layer can be varied within a range from yellowish to the reddish, it is also possible to give a better appearance to the bobbin case basket, the rotary hook, or the bobbin case when this method is employed to finish them up.

(b) High hardness metallization can be achieved. More particularly, more than 1,000 Vickers hardness can be accomplished under general conditions, while under the best condition 2,000 Vickers hardness can be attained. Since such high hardnesses can be achieved, as above, resistance to friction between contacting faces of the bobbin case basket and the rotary hook can be improved.

(c) Thread breakage can be avoided, because friction coefficients can be decreased and hence better slippage of the members can be achieved.

(d) Durability of the members can be improved, since the bobbin case basket, the rotary hook, or other members can be readily cooled down because of high thermal conductivity.

(e) Excellent resistance to wear can be accomplished owing to high Young's modulus obtained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A rotary hook assembly comprising:

a bobbin case basket having an accommodation chamber therein for receiving a bobbin case, said bobbin case basket having a guide rim formed on the outer periphery thereof, the surface of said bobbin case basket having a coating consisting only of titanium nitride thereon, said coating of titanium nitride having a hardness of 1000 to 2000 Vickers;

a rotary hook having an accommodation chamber therein for receiving said bobbin case basket, said rotary hook having a guide groove formed on the inner periphery thereof, said guide groove being sized to receive said guide rim of said bobbin case basket, the surface of said rotary hook having a coating consisting only of titanium nitride thereon, said coating of titanium nitride having a hardness of 1000 to 2000 Vickers;

a bobbin case having lever plate means for holding said bobbin case in said accommodation chamber of said bobbin case basket, the surface of said bobbin case having a coating consisting only of titanium nitride having a hardness of 1000 to 2000 Vickers;

said bobbin case being assembled in said bobbin case basket and said bobbin case basket with said bobbin case therein being assembled within said rotary hook;

whereby an improved rotary hook assembly is provided which avoids thread breakage due to decreased coefficients of friction between said rotary hook, said bobbin case basket and said bobbin case, [an] *and* said rotary hook assembly has improved durability of said rotary hook said bobbin case basket and said bobbin case due to the high hardness and wear resistance of the titanium nitride coatings.

*2. A rotary hook assembly comprising:*

*a bobbin case basket having an accommodation chamber therein for receiving a bobbin case, said bobbin case basket having a guide rim formed on the outer periphery thereof;*

*a rotary hook having an accommodation chamber therein for receiving said bobbin case basket, said rotary hook having a guide groove formed on the inner periphery thereof, said guide groove being sized to receive said guide rim of said bobbin case basket, the surface of said rotary hook having a coating consisting only of titanium nitride having a hardness of 1000 to 2000 Vickers on the inner periphery thereof;*

*a bobbin case having lever plate means for holding said bobbin case in said accommodation chamber of said bobbin case basket;*

*said bobbin case being assembled in said bobbin case basket and said bobbin case basket with said bobbin case therein being assembled within said rotary hook;*

*whereby an improved rotary hook assembly can be provided which avoids thread breakage due to decreased coefficients of friction between said rotary hook and said bobbin case basket, and said rotary hook assembly has improved durability of said rotary hook due to the high hardness and wear resistance of the titanium nitride coating.*

*3. A rotary hook assembly comprising:*

*a bobbin case basket having an accommodation chamber therein for receiving a bobbin case, said bobbin case basket having a guide rim formed on the outer periphery thereof;*

*a rotary hook having an accommodation chamber therein for receiving said bobbin case basket, said rotary hook having a guide groove formed on the inner periphery thereof, said guide groove being sized to receive said guide rim of said bobbin case basket;*

*a bobbin case having lever plate means for holding said bobbin case in said accommodation chamber of said bobbin case basket, the surface of said bobbin case having a coating consisting only of titanium nitride having a hardness of 1000 to 2000 Vickers on at least one of the inner periphery and the outer periphery thereof;*

*said bobbin case being assembled in said bobbin case basket and said bobbin case basket with said bobbin case therein being assembled within said rotary hook;*

*whereby an improved rotary hook assembly can be provided which avoids thread breakage due to decreased coefficients of friction between said bobbin case basket and said bobbin case and said rotary hook assembly has improved durability of said bobbin case due to the high hardness and wear resistance of the titanium nitride coating.*

*4. A rotary hook assembly comprising:*

*a bobbin case basket having an accommodation chamber therein for receiving a bobbin case, said bobbin case basket having a guide rim formed on the outer periphery thereof, the surface of said bobbin case basket having a coating consisting only of titanium nitride having a hardness of 1000 to 2000 Vickers on the outer periphery thereof;*

*a rotary hook having an accommodation chamber therein for receiving said bobbin case basket, said rotary hook having a guide groove formed on the inner periphery thereof, said guide groove being sized to receive said guide rim of said bobbin case basket;*

*a bobbin case having lever plate means for holding said bobbin case in said accommodation chamber of said bobbin case basket;*

*said bobbin case being assembled in said bobbin case basket and said bobbin case basket with said bobbin case therein being assembled within said rotary hook;*

*whereby an improved rotary hook assembly can be provided which avoids thread breakage due to decreased coefficients of friction between said rotary hook and said bobbin case basket or between said bobbin case and said bobbin case basket and said rotary hook assembly has improved durability of said bobbin case basket due to the high hardness and wear resistance of the titanium nitride coating.*

*5. A rotary hook assembly comprising:*

*a bobbin case basket having an accommodation chamber therein for receiving a bobbin case, said bobbin case basket having a guide rim formed on the outer periphery thereof;*

*a rotary hook having an accommodation chamber therein for receiving said bobbin case basket, said rotary hook having a guide groove formed on the inner periphery thereof, said guide groove being sized to receive said guide rim of said bobbin case basket, the surface of said rotary hook having a coating consisting only of titanium nitride having a hardness of 1000 to 2000 Vickers on at least one of the inner periphery and the outer periphery thereof;*

*a bobbin case having lever plate means for holding said bobbin case in said accommodation chamber of said bobbin case basket, the surface of said bobbin case having a coating consisting only of titanium nitride having a hardness of 1000 to 2000 Vickers on at least one of the inner periphery and the outer periphery thereof;*

*said bobbin case being assembled in said bobbin case basket and said bobbin case basket with said bobbin case therein being assembled within said rotary hook;*

*whereby an improved rotary hook assembly can be provided which avoids thread breakage due to decreased coefficients of friction between said bobbin case basket and said bobbin case and said rotary hook assembly has improved durability of said bobbin case due to the high hardness and wear resistance of the titanium nitride coating.*

*6. A rotary hook assembly comprising:*

*a bobbin case basket having an accommodation chamber therein for receiving a bobbin case, said bobbin case basket having a guide rim formed on the outer periphery thereof, the surface of said bobbin case basket having a coating consisting only of titanium nitride having a hardness of 1000 to 2000 Vickers on at least one of the inner periphery and the outer periphery thereof;*

*a rotary hook having an accommodation chamber therein for receiving said bobbin case basket, said rotary hook having a guide groove formed on the inner periphery thereof, said guide groove being sized to receive said guide rim of said bobbin case basket;*

*a bobbin case having lever plate means for holding said bobbin case in said accommodation chamber of said bobbin case basket, the surface of said bobbin case having a coating consisting only of titanium nitride having a hardness of 1000 to 2000 Vickers on at least one of the inner periphery and the outer periphery thereof;*

*said bobbin case being assembled in said bobbin case basket and said bobbin case basket with said bobbin case therein being assembled within said rotary hook;*

*whereby an improved rotary hook assembly can be provided which avoids thread breakage due to decreased coefficients of friction between said bobbin case basket and said bobbin case and said rotary hook assembly has improved durability of said bobbin case due to the high hardness and wear resistance of the titanium nitride coating.*

*7. A rotary hook assembly comprising:*

*a bobbin case basket having an accommodation chamber therein for receiving a bobbin case, said bobbin case basket having a guide rim formed on the outer periphery thereof, the surface of said bobbin case basket having a coating consisting only of titanium nitride having a hardness of 1000 to 2000 Vickers on at least one of the inner periphery and the outer periphery thereof;*

*a rotary hook having an accommodation chamber therein for receiving said bobbin case basket, said rotary hook having a guide groove formed on the inner periphery thereof, said guide groove being sized to receive said guide rim of said bobbin case basket, the surface of said rotary hook having a coating consisting only of titanium nitride having a hardness of 1000 to 2000 Vickers on at least one of the inner periphery and the outer periphery thereof;*

*a bobbin case having lever plate means for holding said bobbin case in said accommodation chamber of said bobbin case basket;*

*said bobbin case being assembled in said bobbin case basket and said bobbin case basket with said bobbin case therein being assembled within said rotary hook;*

*whereby an improved rotary hook assembly can be provided which avoids thread breakage due to decreased coefficients of friction between said rotary hook and said bobbin case basket, and said rotary hook assembly has improved durability of said rotary hook due to the high hardness and wear resistance of the titanium nitride coating.*

* * * * *